US007223337B1

(12) United States Patent
Franzino et al.

(10) Patent No.: US 7,223,337 B1
(45) Date of Patent: May 29, 2007

(54) APPARATUS AND METHOD FOR CLEANING COOLING TOWER RECIRCULATING WATER

(75) Inventors: Joseph J Franzino, Redding, CT (US); Ron Jerman, Dix Hills, NY (US)

(73) Assignee: Goodway Technologies Corporation, Stamford, CT (US)

(*) Notice: Subject to any disclaimer, the term of this patent is extended or adjusted under 35 U.S.C. 154(b) by 0 days.

(21) Appl. No.: 10/764,757

(22) Filed: Jan. 26, 2004

(51) Int. Cl.
*B01D 35/28* (2006.01)

(52) U.S. Cl. .................................... 210/241; 210/416.1

(58) Field of Classification Search ................ 210/167, 210/241, 406, 407, 408, 416.1, 470, 513
See application file for complete search history.

(56) References Cited

U.S. PATENT DOCUMENTS

| | | | | |
|---|---|---|---|---|
| 1,586,292 | A * | 5/1926 | Cornwall | 210/241 |
| 2,596,151 | A * | 5/1952 | Hudson | 134/168 R |
| 3,245,420 | A * | 4/1966 | Cherney | 134/103.1 |
| 3,413,149 | A * | 11/1968 | Gilmore | 134/22.18 |
| 3,528,551 | A * | 9/1970 | Herubel | 210/196 |
| 4,306,967 | A * | 12/1981 | Trautwein | 210/167.31 |
| 4,362,628 | A * | 12/1982 | Kennedy et al. | 210/712 |
| 4,366,063 | A * | 12/1982 | O'Connor | 210/652 |
| 4,374,024 | A * | 2/1983 | Peloquin et al. | 210/241 |
| 4,377,475 | A * | 3/1983 | Wiedemann | 210/136 |
| 4,383,920 | A * | 5/1983 | Muller et al. | 210/87 |
| 4,389,351 | A * | 6/1983 | O'Brien | 261/36.1 |
| 4,427,553 | A * | 1/1984 | Fore | 210/743 |
| 4,534,869 | A * | 8/1985 | Seibert | 210/788 |
| 4,659,460 | A * | 4/1987 | Muller et al. | 210/93 |
| 4,683,067 | A * | 7/1987 | Aleman et al. | 210/767 |
| 4,801,376 | A * | 1/1989 | Kulitz | 210/123 |
| 4,839,064 | A * | 6/1989 | McBurney et al. | 210/806 |
| 5,392,814 | A * | 2/1995 | Brotcke et al. | 137/899 |
| 5,399,260 | A * | 3/1995 | Eldredge et al. | 210/87 |
| 5,453,207 | A * | 9/1995 | Simpson et al. | 210/739 |
| 5,611,920 | A * | 3/1997 | Simpson et al. | 210/192 |
| 5,632,892 | A * | 5/1997 | Klein | 210/257.2 |
| 5,879,565 | A * | 3/1999 | Kusmierz et al. | 210/757 |
| 6,309,169 | B1 * | 10/2001 | Carlile | 414/498 |
| 6,365,046 | B1 * | 4/2002 | Burke | 210/416.1 |
| 6,464,884 | B1 * | 10/2002 | Gadgil | 210/748 |
| 6,716,340 | B2 * | 4/2004 | Meyer | 210/167 |
| 6,863,827 | B2 * | 3/2005 | Saraceno | 210/748 |

OTHER PUBLICATIONS

GOODWAY Cooling Tower Vacuum CTV-1500; from website:http://www.goodway.com; no date; 3 pages.*

* cited by examiner

*Primary Examiner*—Robert James Popovics
*Assistant Examiner*—T. Woodruff
(74) *Attorney, Agent, or Firm*—Patrick J. Walsh

(57) ABSTRACT

An apparatus and method for removing water and debris from a cooling tower basin, discarding debris and returning clean water to the basin.

3 Claims, 2 Drawing Sheets

APPARATUS AND METHOD FOR CLEANING COOLING TOWER RECIRCULATING WATER

BACKGROUND OF THE INVENTION

The present invention is directed to cooling towers and particularly to an apparatus and method for removing water and debris from a cooling tower basin, discarding debris and returning clean water to the basin.

Cooling towers are a component of commercial and industrial heat transfer equipment including for example chillers, coolers, and air conditioning systems. A cooling tower transfers heat from such equipment to ambiance. In a cooling tower, heat is removed from recirculating cooling water by cascading the water over baffles and by drawing a countercurrent of ambient air through the baffles so as to cool the cascading water. Air so heated is exhausted to atmosphere and the cooled recirculating water is collected in a basin situated in the tower under the baffles. The cooling tower basin being exposed to the atmosphere accumulates sediment including airborne dirt, dust, organic matter and so forth that contaminates the water and consequently fouls heat exchange tubes in a heat transfer system.

There are systems for cleaning cooling tower basins such as U.S. Pat. No. 4,839,064 directed to the use of an installation of a siphon and filter together with a portable tool for cleaning one or multiple basins, or a permanent installation including a basin tool for one or more towers. According to the patent disclosure, water and debris are siphoned from a cooling tower and discharged to sewer through a filter. In a modified apparatus for an above-grade siphon, a pump within a hermetically sealed receiver establishes and maintains a siphon from basin through a filter to discharge. For operation of the modified apparatus of the patent, the system is primed between basin and receiver, and the pump is operated to draw water and sediment from the basin for discharge through a filter. The '064 patent requires a permanent installation of components such as receiver and pump unit, or is limited to slow and uncertain action of continuous siphon action for cleaning a basin.

U.S. Pat. No. 4,306,967 discloses a trailer mounted cleaning apparatus for cleaning cooling tower water including a diesel engine driven pump, a filter device, a bank of hydrocyclone separators, and a sediment collecting tank. Clarified effluent from a cooling tower basin is recirculated back to the cooling tower basin, and sediment is collected in the tank for later removal by means of an auger fitted into the tank.

There is need for a conveniently deployed and operationally efficient method and apparatus for cleaning cooling tower basins.

The present invention is directed to an apparatus and method for removing contaminating debris from cooling tower basins.

SUMMARY OF THE INVENTION

In accordance with the present invention, a cooling tower recirculating water cleaning apparatus comprises an integrated portable machine including a mounting carriage, a debris collecting tool, a strainer, a motor driven self-priming centrifugal pump, and a discharge line to drain. The apparatus cleans the cooling tower basin by placing the debris collecting tool into the basin, priming the pump, and operating the pump to withdraw water and debris from the basin, straining the water and debris upstream of the pump, and discharging water and entrained debris to a sewer. In preparation for cleaning the basin, make-up water is added to the basin to allow for removal of approximately 20–25% of basin water in a cleaning operation. Thereafter, the basin debris is undisturbed allowing it to settle to the bottom of the basin for 24–48 hours before cleaning. For actual cleaning the collecting tool is placed in the basin water to collect and remove debris as the centrifugal pump removes and discards debris laden water.

In a modified embodiment of the apparatus of the invention, water and debris drawn from a cooling tower basin is filtered during a cleaning operation, and filtered water is returned to the basin.

Specific examples are included in the following description for purposes of clarity, but various details can be changed within the scope of the present invention.

OBJECTS OF THE INVENTION

An object of the invention is to provide an apparatus and method for removing sediment and debris from a cooling tower basin.

Another object of the invention is to provide a mobile apparatus for quickly, conveniently and routinely cleaning cooling tower water of sediment and debris so that recirculating cooling tower water is maintained in a clean condition thereby avoiding fouling heat exchanger tubes.

Another object of the invention is to provide apparatus for quickly, conveniently and routinely cleaning a cooling tower water basin of sediment and debris and returning filtered water to the basin.

Other and further objects of the invention will become apparent with an understanding of the following detailed description of the invention or upon employment of the invention in practice.

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE PREFERRED EMBODIMENT

Figure 1:
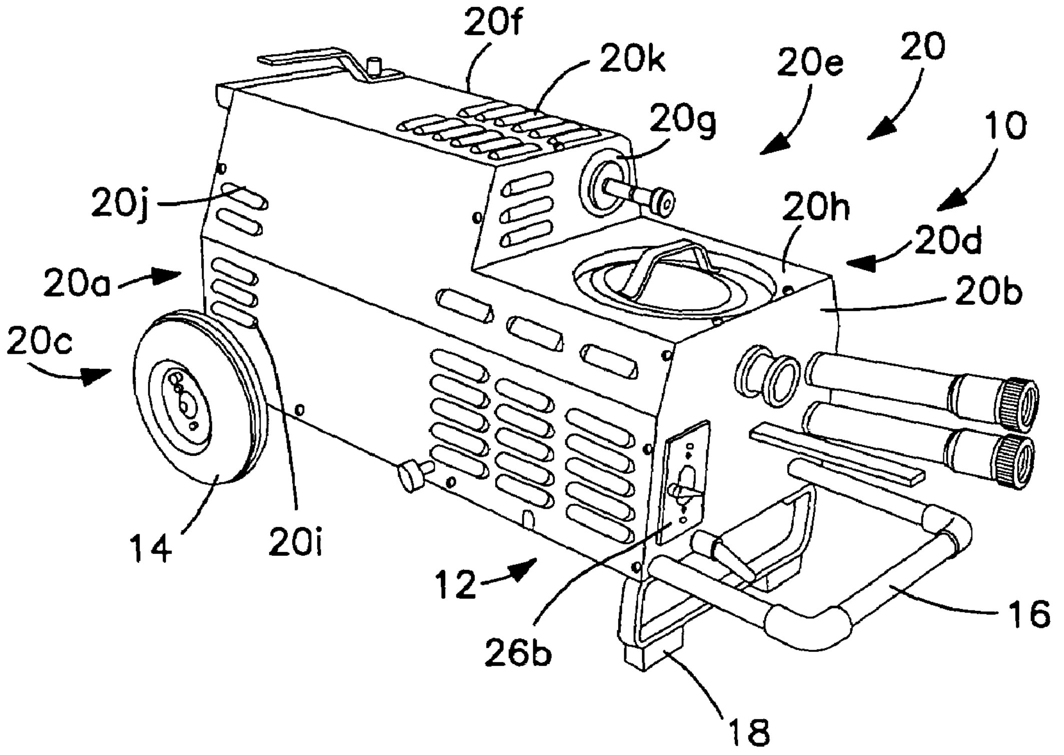
FIG. 1 is perspective view of an apparatus for cleaning cooling tower water according to the invention.

Referring to the drawing, the apparatus 10 for cleaning cooling tower water according to the invention comprises a carriage 12 having a supporting base 12_a_ fabricated of robust material such as steel or aluminum for mounting the operating components of the apparatus, a set of wheels 14 affixed to one end 12_b_ of the base for wheeling the apparatus into position beside a cooling tower, an extensible handle 16 projecting from the other end 12_d_ of the base, and a stand 18 depending from the other end of the base for level positioning of the apparatus for cleaning a cooling tower basin and recirculating water.

The apparatus further includes an outer housing 20 mounted along the perimeter of the base in covering relation to the operating components and comprising upstanding front 20_a_, rear 20_b_, left 20_c_ and right 20_d_ side walls, and a top cover wall 20*e* in three sections of upper 20*f*, vertical 20*g*, and lower 20*h* top wall portions. The left and right side walls include lower vertical 20*i* and upper inclined 20*j* sections. The outer housing is formed of robust material such as stainless steel or aluminum, and has ventilation slots or louvers 20*k* for admitting ambient cooling air to the interior operating components of the apparatus.

Figure 2:
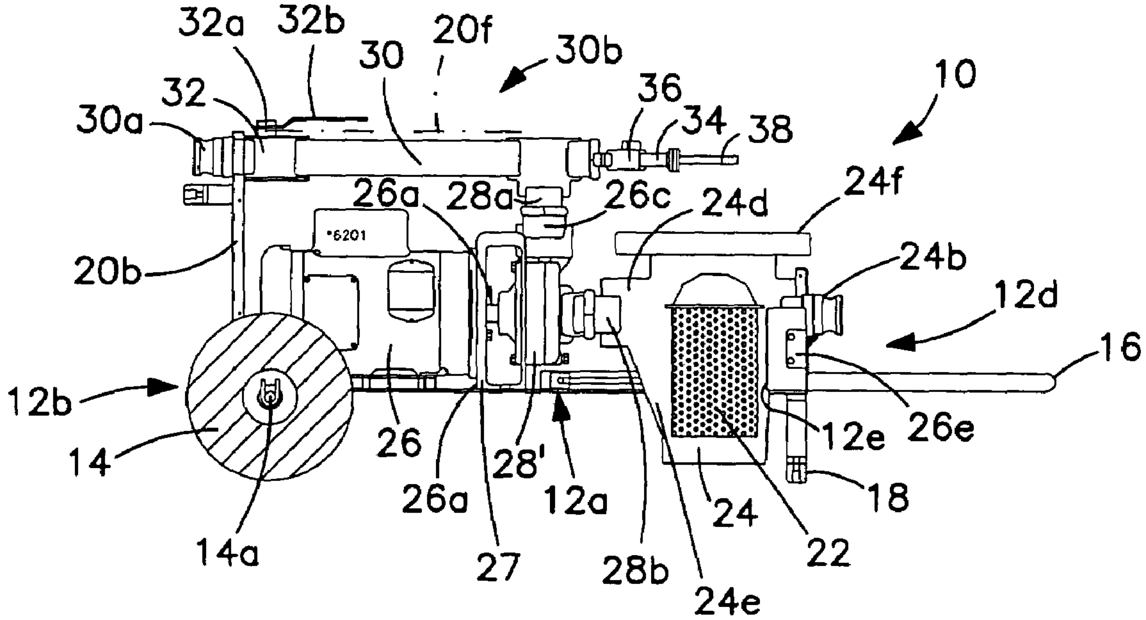
FIG. 2 is a side elevation view of interior components of the apparatus of FIG. 1.

As shown in FIG. 2, the operating components of the apparatus assembled on the mounting carriage base 12*a* comprise a strainer 22 within a strainer housing 24, a drive motor 26, a centrifugal pump 28, and a discharge line 30 to drain.

The mounting base 12*a* is a robust aluminum plate with planar surface of sufficient strength to carry the operating components and to withstand torsion and other forces generated in operation of the apparatus. A pair of semi-pneumatic supporting wheels 14 connected by an axle 14*a* support one end 12*b* of the base and provide for close positioning of the apparatus at a cooling tower basin (FIG. 3) enabling an operator to manipulate vacuum hoses and tools as desired for cleaning the basin.

An electric drive motor 26 is positioned at the one end of the mounting base between the wheels and is bolted to the base plate. A pump-mounting cage 27 is bolted to the front face 26*a* of the drive motor and the cage in turn receives centrifugal pump 28 bolted to the cage with the pump shaft 28*a* in axial alignment with and connected to the motor drive shaft 26*a*. The result is integral mounting of motor and pump affixed to each other and with only the electric motor affixed to the mounting base. The electric motor is preferably one and one-half horsepower and either 115*v* or 230*v* with an on/off operating switch 26*b*. The centrifugal pump is preferably of 60 gpm capacity with discharge overpressure of approximately 39 psi and an inlet underpressure of approximately 11 psi.

The centrifugal pump 28 includes an axial inlet manifold 28*b* and a tangential outlet manifold 28*c* for drawing, fluid to the inlet at a negative 11 psi and discharging at positive 39 psi at the outlet.

A lightweight strainer housing 24 has an integral outlet connection 24*d* that is affixed to and supported in operating position by the pump inlet manifold 28*d*. The strainer housing is preferably fabricated of molded plastic with imperforate outer wall 24*a* projecting through an opening 12*e* in the mounting base, a fluid inlet connection 24*b*, an outlet connection 24*d*, an interior chamber 24*e* for receiving a perforated fluid strainer, and a removable top cover 24*f* for periodically removing and cleaning the strainer. Interior baffles (not shown) in the strainer housing direct inlet water through the strainer before entering the pump inlet manifold. The strainer 22 is preferably fabricated of aluminum with three-sixteenth inch perforations.

Figure 3:
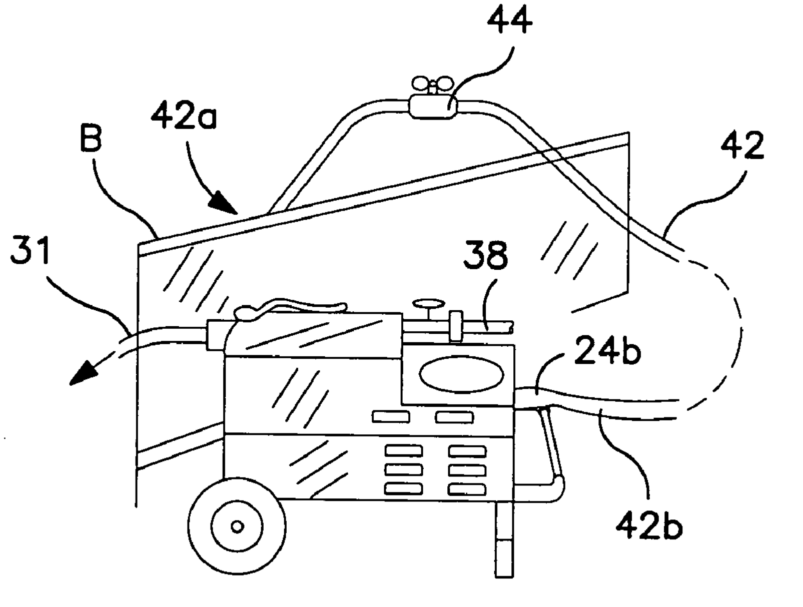
FIG. 3 is a view of the apparatus in position for cleaning a cooling tower in practice of the invention.

A discharge pipe 30 is connected to the pump discharge manifold 28*c* and extends underneath the upper top wall 20*f* through the rear housing wall 20*b* and terminates in a discharge connection 30*a* which receives a drain hose 31 (FIG. 3). A discharge valve 32 is fitted to the discharge pipe with valve stem 32*a* extending through the upper wall 20*f* and a stop valve handle 32*b* accessible outside the upper wall. The front end 30*b* of the discharge pipe is fitted with a priming water hose connection 34 and priming water valve 36 for regulating-water flow through this connection. As more fully described below, a water hose 38 connected to the discharge pipe with closed discharge valve and open priming valve provides for initial priming of the centrifugal pump prior to cleaning a tower basin.

It is to be understood that the apparatus of the present invention especially as seen in FIG. 2 comprises a robust, compact maneuverable assembly in which an integral unit comprising motor, pump, strainer housing, and discharge pipe are affixed to each other with only the motor housing affixed to the mounting base, and with heavy components including drive motor, mounting cage, centrifugal pump and discharge pipe positioned from midpoint 12*c* to the one end 12*b* of the mounting base ensuring that the wheeled end of the unit bears a major portion of unit weight both at rest and while in motion. The entire apparatus weighs on the order of one hundred twenty-five pounds and is provided with a handle 16 that is extended (FIG. 2) for added leverage in tilting the carriage to "wheel around" position and retracted (FIG. 3) for compact storage when the unit is stationed at a cooling tower for cleaning operations.

Figure 4:
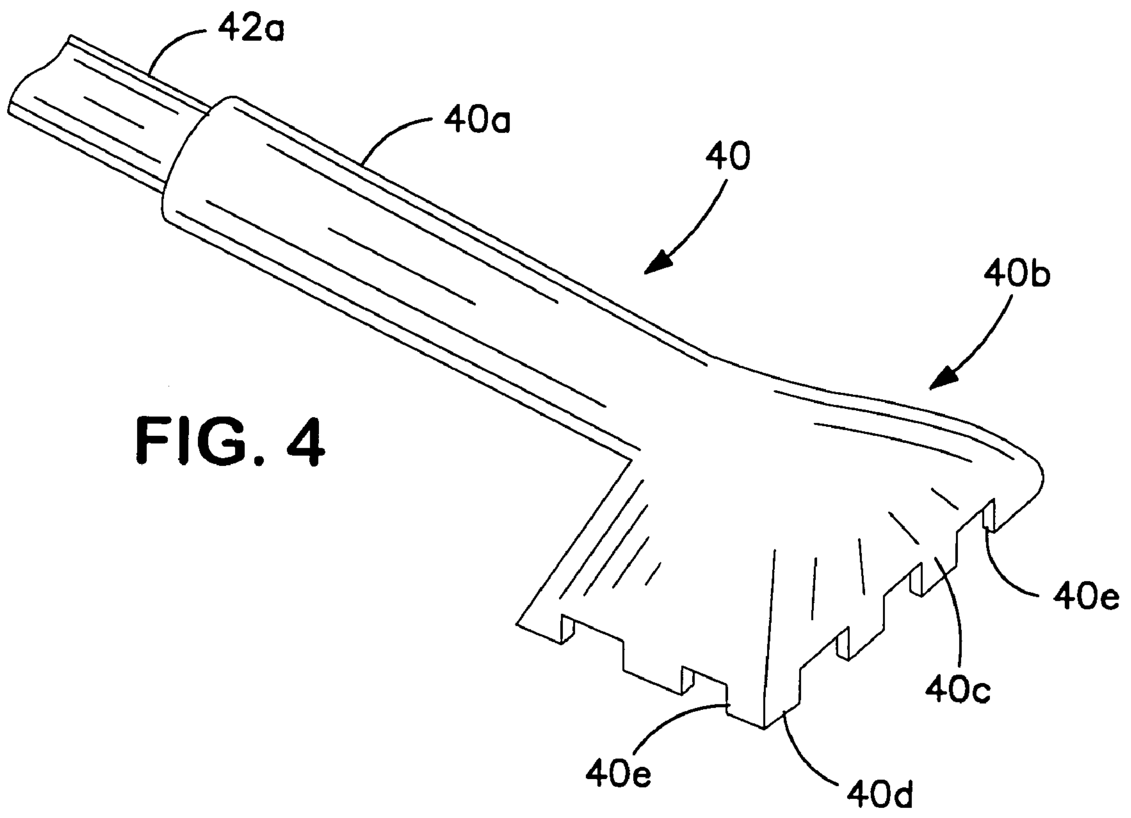
FIG. 4 is a perspective view of a tool for engaging and vacuum gathering water and sediment in a cooling tower basin.

As shown in FIG. 4, the apparatus includes a basin tool 40 through which water and sediment are drawn by the centrifugal pump. The tool is fitted to the far end 42*a* (FIG. 4) of an inlet hose 42 that extends from the basin B for connection at its near end 42*b* to the strainer housing inlet 24*b* (FIG. 3). The inlet hose is provided with an inlet control valve 44 allowing an operator to open and close the inlet hose as desired during a cleaning operation.

The tool 40 is a hollow shell with a tubular portion 40*a* for connection to the inlet hose 42, and an integral head 40*b* with walls in the general form of a prism. The tool head walls define a depending skirt 40*c* with a generally rectangular perimeter edge 40*d* having spaced rectangular notches 40*e* defining a plurality of portals for passage of water and sediment from a cooling tower basin into the tool head when the centrifugal pump is in operation pulling negative 11 psi through the tool.

To prepare for cleaning a cooling tower basin, make-up water of about 20–25% of tower capacity is added to the system. The cooling tower is then shut down for a 24-hour period allowing sediment to settle in the cooling tower basin. The apparatus of the present invention is wheeled into position next to the basin with the tool head placed in the basin. The centrifugal pump is primed when the system is filled with water between the discharge valve and the tool head situated in the basin. Priming is accomplished by closing the discharge valve, opening the prime water inlet valve, connecting the inlet hose at its near end to strainer inlet with basin tool at the far end submerged in basin water, opening the inlet hose valve, and flooding the system between discharge valve and basin tool with tap water supplied through the prime water valve by a utility hose.

For operating the unit to evacuate the basin and clean the cooling tower water, the motor switch is turned on to start pumping, the discharge valve is immediately opened and the prime valve is closed. Water and sediment pumped from a basin may be discharged to a sewer or may be filtered and clean water returned to the basin. When an operation is complete, the strainer is removed, cleaned and replaced and the unit flushed with clean water.

In a modified form of the invention, a self-priming centrifugal pump may be used.

Various changes may be made to the structure embodying the principles of the invention. The foregoing embodiments are set forth in an illustrative and not in a limiting sense. The scope of the invention is defined by the claims appended hereto.

We claim:

1. An apparatus for cleaning cooling tower basins comprising a carriage having a base plate for mounting operating components of the apparatus, a pair of wheels fitted to one end of the carriage, an extensible handle fitted to the other end of the carriage for extension to provide leverage in tilting the carriage for movement, a stand depending from the other end of the carriage for level positioning the carriage, the base plate, pair of wheels and extensible handle defining a hand truck for maneuvering the apparatus into position adjacent to a cooling tower basin, a drive motor affixed to the base plate adjacent the one end of the carriage to weight-load the apparatus toward the carriage wheels, the drive motor having a drive shaft and having a front face, a pump mounting cage affixed to the motor front face, a centrifugal pump affixed to the cage, the pump having an axial shaft connected to the motor drive shaft so that the motor drives the pump, the pump having an axial inlet manifold and a tangential outlet manifold, a strainer housing defining a strainer chamber, the strainer housing having an outlet connection affixed to the pump inlet manifold, the strainer housing further having an inlet connection, a strainer positioned in the strainer chamber for straining water and debris passing through the housing, a discharge pipe defining a passage from the pump outlet manifold to a discharge connection from the apparatus, a discharge valve in the discharge pipe, a prime water connection fitted to the discharge pipe upstream of the discharge valve, a prime water valve in the prime water connection so that the operating components including drive motor, cage, pump, strainer housing, and strainer are connected to each other as an integral unit with the unit being connected to the carriage base solely through the drive motor and that the apparatus is readily wheeled into position adjacent a cooling tower.

2. An apparatus as defined in claim 1 which further comprises an outer housing mounted along the perimeter of the base plate in covering relation to the operating components, the outer housing having a top cover wall including an upper portion covering the discharge pipe and a lower portion covering the strainer housing, and the discharge pipe passing over the operating components from pump outlet manifold to the discharge connection at said one end of the carriage so that the discharge pipe further weight-loads the apparatus toward the carriage wheels.

3. An apparatus as defined in claim 1 which further includes an inlet hose connected at one end to the strainer housing and at another end to the basin, a water and debris collection tool fitted to the basin end of the inlet hose, the tool being a hollow shell with a tubular portion for connection to the inlet hose, and an integral head with walls defining a depending skirt terminating in a perimeter edge with spaced notches defining a plurality of portals for passage of water and sediment.

* * * * *